US007822838B2

(12) United States Patent
Veikkolainen

(10) Patent No.: US 7,822,838 B2
(45) Date of Patent: Oct. 26, 2010

(54) SYSTEM, METHOD, AND NETWORK ELEMENTS FOR PROVIDING A SERVICE IN A COMMUNICATION NETWORK

(75) Inventor: Simo Veikkolainen, Espoo (FI)

(73) Assignee: Nokia Siemens Networks Oy, Espoo (FI)

(*) Notice: Subject to any disclaimer, the term of this patent is extended or adjusted under 35 U.S.C. 154(b) by 1305 days.

(21) Appl. No.: 11/247,327

(22) Filed: Oct. 12, 2005

(65) Prior Publication Data

US 2007/0004388 A1 Jan. 4, 2007

(30) Foreign Application Priority Data

Jun. 29, 2005 (EP) .................................. 05014196

(51) Int. Cl.
*G06F 15/173* (2006.01)
(52) U.S. Cl. ...................... 709/223; 709/224; 709/203; 379/114.01; 379/114.28
(58) Field of Classification Search ................. 709/223, 709/224, 203, 217, 219; 455/331, 435.1, 455/436; 379/114.01, 114.08, 114.28, 201.01, 379/201.02, 201.12, 221.08
See application file for complete search history.

(56) References Cited

U.S. PATENT DOCUMENTS

| 5,796,950 | A  | * | 8/1998 | Sips et al. ................... 709/218 |
| 6,937,850 | B2 | * | 8/2005 | Lippelt ....................... 455/408 |
| 7,509,425 | B1 | * | 3/2009 | Rosenberg .................. 709/227 |
| 2004/0058667 | A1 | * | 3/2004 | Pienmaki et al. ............ 455/405 |
| 2005/0021351 | A1 | * | 1/2005 | Koskinen et al. ............... 705/1 |
| 2005/0213721 | A1 | * | 9/2005 | Hakala et al. .......... 379/114.01 |
| 2006/0212511 | A1 | * | 9/2006 | Garcia-Martin ............. 709/203 |
| 2007/0066270 | A1 | * | 3/2007 | Dantu et al. ................ 455/331 |
| 2010/0017518 | A1 | * | 1/2010 | Holmberg ................... 709/227 |

OTHER PUBLICATIONS

G. Camarillo, Ed., -Ericsson—W. Marshall, Ed.—AT&T-J. Rosenberg,-Dynamicsoft, "Integration of Resource Management and Session Initiation Protocol (SIP)", Oct. 2002, pp. 1-28.
International Telecommunication Union, "General Recommendations on Telephone Switching and Signalling functions and Information Flows for services in the ISDN—Stage 2 Description for Charging Supplementary Services—Clause 3-Reverse Charging (REV)", Mar. 1993, pp. 1-50.
ETSI—DTS TISPAN-01002-NGN V0.1.7, "Requirements for PSTN/ISDN simulation services; Telecommunications and Internet Converged Services and Protocols for Advanced networking (TISPAN)", Mar. 2005, pp. 1-52.

* cited by examiner

*Primary Examiner*—Lashonda T Jacobs
(74) *Attorney, Agent, or Firm*—Squire, Sanders & Dempsey, LLP

(57) ABSTRACT

The invention provides a system, method, network elements, and computer program products, for providing a supplementary service such as an advice of charge, AoC, service requested by a user equipment at a session set-up or during a session of a communication service. For setting up a session of the communication service, a signalling message may be transmitted or received which signalling message comprises a request for a supplementary service and an indication on whether the session setup is to be suspended until said supplementary service has been provided. When detecting that said setting up the session of the communication service is to be suspended until said supplementary service has been provided, the session setup is suspended until after the requested supplementary service has been provided. The setting up of the session is resumed after determining that said supplementary service has been provided.

24 Claims, 5 Drawing Sheets

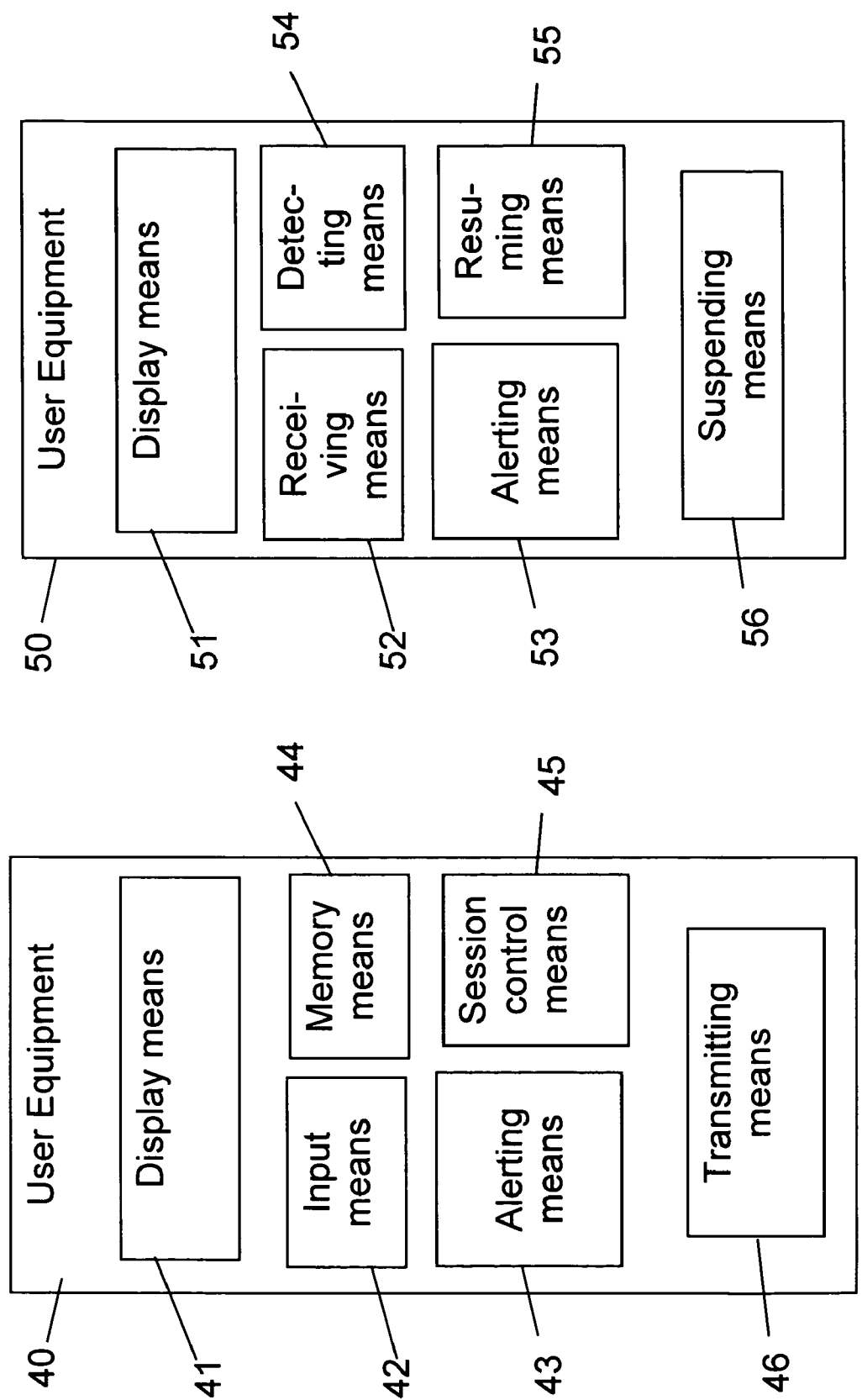

SYSTEM, METHOD, AND NETWORK ELEMENTS FOR PROVIDING A SERVICE IN A COMMUNICATION NETWORK

FIELD AND BACKGROUND OF THE INVENTION

The present invention relates to a system, method, network elements, and computer program products, for providing a service such as a supplementary service. The service may preferably be provided with or for another service such as a communication service which may e.g. be a voice communication service, a data communication service, a multimedia communication service, etc. The service may preferably be provided using preconditions. The supplementary service and the communication service are provided in a communication network with a suitable protocol, preferably Session Initiation Protocol, SIP, and preferable in a SIP network such as the IP Multimedia Subsystem (IMS).

European Telecommunications Standards Institute (ETSI), Telecommunications and Internet Converged Services and Protocols for Advanced Networking (TISPAN) standardisation group, has published a document draft ETSI DTS TISPAN-01002-NGN V0.1.7 (2005-03) that describes requirements for Public Switched Telephone Network (PSTN)/Integrated Services Digital Network (ISDN) services in a communication network using Session Initiation Protocol (SIP). The document defines a recommended set of basic PSTN/ISDN simulation services which will be supported by the TISPAN Next Generation Network (NGN) Release 1 in connection with other networks as a basis for the definition of the network capabilities required. The purpose is to cover transition from PSTN/ISDN networks towards NGN networks and enable proper interconnection between the existing and coming networks.

An example of a service defined in the above-referred standard specification is an Advice of Charge (AoC) supplementary service which purpose is to provide a served user with information about the charging rates at the time of communication establishment or during the communication in the case of charging rates changes.

Another example of a supplementary service defined in the same standard specification is Terminating Identification Presentation (TIP). The TIP simulation service provides the originating party with the possibility of receiving asserted information in order to identify the connected party. In addition to the asserted identity information, the Connected Identity may include address information generated by the connected user and transparently transported by the network. Although normally an originating party knows to whom the party is calling, in case a called party has activated Communication session Deflection (CD) service, the originating party normally does not know to whom the called party has forwarded their communication. However, the called (forwarding) user may select an option that the originating user is notified of communication forwarding and optionally that also the 'forwarded-to' address is transmitted to the originating user. In this case the originating user will receive forwarding notification and optionally the connected user's identity when the communication is answered.

A further example of a communication supplementary service is Reverse Charging Service (REV) defined in International Telecommunication Union Telecommunication Standardization Sector (ITU-T) standard Q.86.3. The reverse charging supplementary service allows a calling user, on a per-call basis, to request reverse charging at the call set-up time and the called user to accept or reject the charges in the set-up response. If the called user accepts the request, the network starts charging the called user with notification of acceptance to the calling user and proceeds with the call. If the called user rejects or ignores the request, the network notifies the calling user and disconnects the call.

The above described services and several other supplementary services have been standardised by ITU and ETSI for Circuit Switched (CS) communication networks. In Packet Switched (PS) communication networks more advanced and user-friendly control mechanism for these services are needed. For example, currently in SIP there is no mechanism defined for AoC supplementary service how, after sending a session setup request, the user could control the session, after receiving some charging related information, whether or not to proceed with the session setup. Also other standardised supplementary services lack of control mechanisms.

SUMMARY OF THE INVENTION

The present invention provides a method, system, network element and user equipments as defined in the claims.

According to one aspect, the invention provides a method for providing a supplementary service at a session setup of a communication service, the method comprising the steps of: transmitting a signalling message for setting up a session of a communication service, the signalling message comprising a request for a supplementary service and an indication on whether the session setup is to be suspended until said supplementary service has been provided; detecting that said setting up the session of the communication service is to be suspended until said supplementary service has been provided; providing said supplementary service; and resuming said setting up the session of the communication service after determining that said supplementary service has been provided.

The method may further comprise the steps of suspending said setting up the session of the communication service until input of a confirmation to the provided supplementary service; inputting the confirmation to the provided supplementary service; and resuming said setting up of the session of the communication service after input of the confirmation of the supplementary service. The signalling message may preferably comprise a precondition defining said request for said supplementary service and said indication on whether the session setup is to be suspended until said supplementary service has been provided. The feature of suspending of the setting up of the session of the communication service can e.g. be implemented by suppressing a step of alerting a called party.

The feature of suspending of the setting up of the session of the communication service may for example be implemented by not forwarding the session setup request to a called user equipment. The resuming of said setting up the session of the communication service can e.g. be implemented in a calling user equipment, or in a network element involved in providing the supplementary service, or in a called user equipment.

The supplementary service may preferably be at least one of an Advice of Charge service informing a user on a charge for the session of the communication service; a Reverse Charging Service informing a called user on a request for charging the called user for the session of the communication service; and a Terminating Identification Presentation (TIP) supplementary service which provides an originating party with an identity of a called party to whom the session is to be connected, or, in case a communication forwarding service has been activated by the called party, the identity of 'forwarded to' party or the identity of a final destination.

According to another aspect, the invention provides a network element for providing a supplementary service at a session setup of a communication service, comprising means for receiving a signalling message for setting up a session of a communication service, the signalling message comprising a request for a supplementary service and an indication on whether the session setup is to be suspended until said supplementary service has been provided; means for detecting that said setting up the session of the communication service is to be suspended until said supplementary service has been provided; means for providing said supplementary service; and means for resuming said setting up the session of the communication service after determining that said supplementary service has been provided.

The resuming means may be configured to receive a further signalling message from said user, indicating that the requested supplementary service has been provided. The network element may be an application server of an IP Multimedia Subsystem.

According to a further aspect, the invention provides a user equipment which comprises means for receiving a signalling message for setting up a session of a communication service, the signalling message comprising a indication of a supplementary service to be provided to a calling user and an indication on whether the session setup is to be suspended until said supplementary service has been provided to the calling user; means for detecting that said setting up the session of the communication service is to be suspended until said supplementary service has been provided; and means for resuming said setting up the session of the communication service after determining that said supplementary service has been provided.

The resuming means is preferably configured to receive a further signalling message, indicating that the requested supplementary service has been provided to the calling user. The suspending means may be configured to suppress alerting a user of the user equipment. The resuming means may be configured to alert a user of the user equipment. The alerting may be caused by generating a sound such as ringing tone, an optical effect and/or by vibration or the like.

According to another aspect, the invention provides a user equipment for requesting a supplementary service at a session setup of a communication service, comprising: means for transmitting a signalling message for setting up a session of a communication service, the signalling message comprising a request for a supplementary service and an indication that a called user is not to be alerted of the session to be set up until said supplementary service has been provided.

The user equipment may further comprise means for determining that the requested supplementary service has been provided. The transmitting means may be configured for transmitting a further signalling message, indicating that the requested supplementary service has been provided. The user equipment may additionally comprise input means for inputting, by a user of the user equipment, information for including said indication that a called user is not to be alerted of the session to be set up, into said signalling message. The transmitting means may be configured for transmitting the further signalling message in response to an input given by a user of the user equipment.

According to another aspect, the invention provides a system for providing a supplementary service at a session setup of a communication service, the system comprising means for transmitting a signalling message for setting up a session of a communication service, the signalling message comprising a request for a supplementary service and an indication on whether the session setup is to be suspended until said supplementary service has been provided; means for detecting that said setting up the session of the communication service is to be suspended until said supplementary service has been provided; means for providing said supplementary service; and means for resuming said setting up the session of the communication service after determining that said supplementary service has been provided.

According to another aspect, the invention provides a computer program product including a program for a processing device, comprising software code portions for performing the method steps as defined above or in the following description when the program is run on the processing device.

The computer program product preferably comprises a computer-readable medium on which the software code portions are stored. The program may e.g. be directly loadable into an internal memory of the processing device.

According to another aspect, the invention provides a computer program product including a program for a network element, e.g. as defined above or in the following description, comprising software code portions for performing, when the program is run on the network element, steps of: receiving a signalling message for setting up a session of a communication service, the signalling message comprising a request for a supplementary service and an indication on whether the session setup is to be suspended until said supplementary service has been provided; detecting that said setting up the session of the communication service is to be suspended until said supplementary service has been provided; providing said supplementary service; and resuming said setting up the session of the communication service after determining that said supplementary service has been provided.

According to another aspect, the invention provides a computer program product including a program for a user equipment, e.g. as defined above or in the following description, comprising software code portions for performing, when the program is run on the user equipment, the steps of: receiving a signalling message for setting up a session of a communication service, the signalling message comprising an indication of a supplementary service to be provided to a calling user and an indication on whether the session setup is to be suspended until said supplementary service has been provided to the calling user; detecting that said setting up the session of the communication service is to be suspended until said supplementary service has been provided; and resuming said setting up the session of the communication service after determining that said supplementary service has been provided.

According to another aspect, the invention provides a computer program product including a program for a user equipment, e.g. as defined above or in the following description, comprising software code portions for performing, when the program is run on the user equipment, the step of transmitting a signalling message for setting up a session of a communication service, the signalling message comprising a request for a supplementary service and an indication that a called user is not to be alerted of the session to be set up until said supplementary service has been provided.

Generally, without restriction thereto, the invention relates to the SIP area, IP Multimedia Subsystem, IMS, NGN, Next Generation Networks, and the implementation of Supplementary Services with SIP. Particularly, but without restriction thereto, it applies to the implementation of the Advice of Charge, Terminating Identification Presentation and Reverse Charging Supplementary Services with SIP.

BRIEF DESCRIPTION OF THE FIGURES

FIG. 4 shows an embodiment of a user equipment in accordance with the present invention, FIG. 5 shows another embodiment of a user equipment in accordance with the present invention.

DETAILED DESCRIPTION OF EMBODIMENTS OF THE INVENTION

Internet Engineering Task Force (IETF) has defined in a document Request for Comments (RFC) 3312: "Integration of Resource Management and Session Initiation Protocol (SIP)" a precondition framework. The document defines a generic framework for preconditions, which framework is meant to be extensible. The only precondition defined in RFC 3312 is Quality of Service (QoS). The disclosure content of RFC 3312 is hereby incorporated into the present application to full extent. The present invention enhances precondition framework for controlling provisioning of supplementary services, such as Advice of Charge, Terminating Identification Presentation and Reverse Charging.

The invention preferably uses such a precondition framework for providing Supplementary Services. Generally, a precondition is a set of constraints about the session which are introduced in the offer from the calling party. The called party or another entity, which receives the offer, generates a response, but does not alert the called user or otherwise proceed with session establishment until the preconditions for the session are met. The conclusion that the preconditions have been met may e.g. be determined through a local event, or through a new offer (confirmation) received from the calling party.

In order to ensure that session establishment does not take place until certain preconditions are met, the precondition framework distinguishes between two different state variables that affect a particular media stream or session, "current status" and "desired status". The desired status consists of a threshold for the current status. Session establishment stops until the current status reaches or surpasses this threshold. Once this threshold is reached or surpassed, session establishment resumes.

Figure 1:
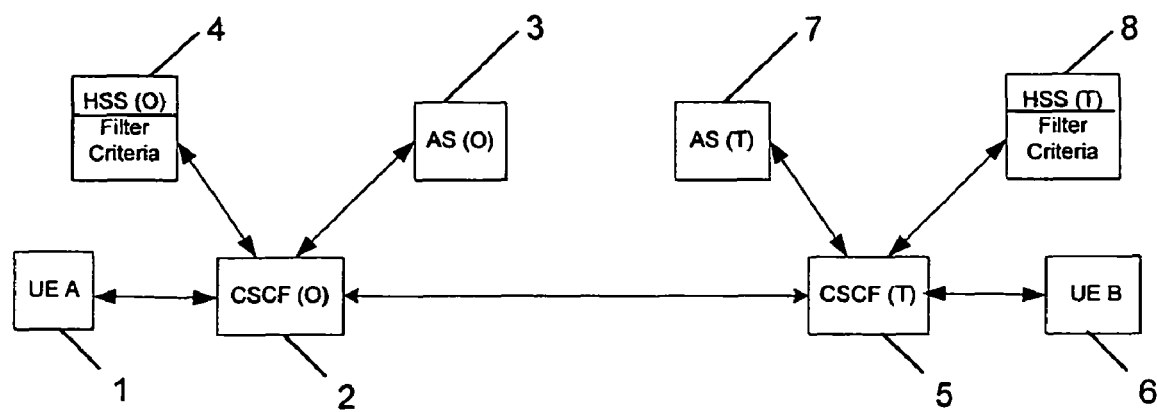
FIG. 1 shows a basic structure of an embodiment of a system, method, and devices in accordance with the invention.

FIG. 1 shows a basic structure of a communication network where services, such as supplementary services, are provided to users. The communication network may be a mobile communication network or a fixed communication network. The network includes, for the originating side initiating a communication or session request, a Call/Session Control Function, CSCF (O), 2 provided for a User Equipment, UE A, 1, originating a communication or session request, an application server, AS (O), 3, for the originating UE 1, and a Home Subscriber Server, HSS (O), 4, associated with the UE 1. In a similar manner, the terminating side, to which the originated communication or session is directed, includes a Call/Session Control Function, CSCF (T), 5, provided for a User Equipment, UE (UE B), 6, intended to receive the requested communication or session, an application server, AS (T), 7 assigned to the UE 6, and a Home Subscriber Server, HSS (T), 8, associated with the UE 6. The letters "O" and "T" added to the components 2 to 5, 7, 8 stand for the "originating" and "terminating" side. The double-headed arrows illustrate the message flows between the elements. The Call/Session Control Functions, CSCF, 2, 5, preferably act, or are implemented as, Serving CSCFs according to the IMS architecture, behaving as SIP servers. SIP stands for Session Initiation Protocol.

The HSS 4 and 8 store filter criteria, in particular initial filter criteria set for the users or UEs assigned to the respective HSS. The filter criteria determine the services that will be provided to each user. Generally, when a user, e.g., UE 1, registers to an IMS network, the Serving Call/Session Control Function, S-CSCF, e.g., CSCF 2 contacts the HSS 4 to download authentication vectors and the initial filter criteria. The initial filter criteria contains a collection of conditions that determine when a particular request has to be forwarded to a particular application server, e.g. an Advice of Charge application server.

In an embodiment of the invention SIP precondition framework is used in providing Advice of Charge (AoC) supplementary service to a user of a communication network. AoC is one of the supplementary services TISPAN is standardising. The current AoC concept comprises several different aspects; a) Invocation of the service (permanent and temporary invocation); b) Provide information of potential charges; c) Request confirmation from the user whether to proceed with the session setup or not; and d) Provide additional information of charges, if required, during mid-call or at the end of the call.

According to this embodiment of the invention, after providing the information on potential charges to the user, the user is able to decide whether he wants to proceed with the session setup or not. According to this embodiment a new precondition is introduced, called for example "aoc", which needs to be met before the session setup may be completed. In other words, the calling user has to accept the potential charges related to the session before the call setup may be finished and called party's phone starts to ring.

A more detailed, non-limiting, example on how the first embodiment may be implemented in protocol level is given next. The sender indicates, in an SDP, Session Description Protocol, offer, for a given media stream that the session setup must not be completed before the precondition related to the Advice of Charge is fulfilled. The sender may do that by including the following lines in the SDP offer:

m=audio 20000 RTP/AVP 0 8
    c=IN IP4 192.0.2.1
    a=curr:aoc local none
    a=curr:aoc remote none
    a=des:aoc mandatory local sendrecv
    a=des:aoc none remote sendrecv The current precondition state ("curr" in the SDP, aoc requested) is followed by a status-type and a direction-tag. The status-type may be "e2e", "local" or "remote", corresponding to a state that applies end-to-end, to the local segment, or to the remote segment. This embodiment uses preferably the "local" and "remote" status-types. The direction tag may be either "none", "send", "recv" or "sendrecv". Since in AoC supplementary service the precondition is not dependent on the media stream direction, "sendrecv" is preferably used. Alternatively, instead of a status-type and a direction-tag, one or more new tags may be introduced which serve the same purpose. Namely, indicating a current status and a desired status regarding a precondition, optionally the status may be indicated separately for both parties.

The desired precondition state ("des" in the SDP) contains a strength-tag, which may be "mandatory", "optional", "none", "failure" or "unknown". The strength-tag indicates whether or not the called party can be alerted in the case the network fails to meet the precondition. If the strength-tag is set to "mandatory" the session must not be completed unless the precondition is met.

In the example above, the sender does not set any requirements for the remote end, which is indicated with the "a=des: aoc none remote sendrevc" line. According to RFC 3312, the SDP answerer may modify this line if it also has some requirements for the preconditions. For the local segment (the originating call leg), the caller sets a mandatory precondition for advice of charge.

The session setup containing the above SDP offer is routed to an application server which generates the AoC information to be delivered to the caller. The AoC information may be sent e.g. using a SIP MESSAGE, or some other means.

The AoC information, that is the charges to be calculated for the session if completed, may be displayed e.g. on a display of the user equipment, and/or may be acoustically announced to the user, and/or informed to the user in any other manner. The user can e.g. use the input section of her/his user equipment for inputting a confirmation of accepting the charges. The session setup will proceed only after the user has input the confirmation. Alternatively, the user may be given a defined time interval for inputting a command for terminating the session setup, the time interval starting with the displaying or announcing of the charging information AoC. The user equipment will wait for the defined time interval and, if not receiving an input from the user stopping the session set-up, automatically generate a confirmation such as a SIP Update message which will be sent to the server for continuing with the session setup.

Once the calling user has accepted the possible charges related to the session, the session setup may proceed. In this embodiment, the User Equipment (UE) of the caller sends an SIP UPDATE message with the following lines in the SDP:

m=audio 20000 RTP/AVP 0 8
c=IN IP4 192.0.2.1
a=curr:aoc local sendrecv
a=curr:aoc remote none
a=des:aoc mandatory local sendrecv
a=des:aoc none remote sendrecv indicating that the local precondition has been met.

It is to be understood that the above SDP coding is only an example of possible coding alternatives and a skilled person can easily implement various coding schemes for the same purpose.

In the following, the first embodiment is described in the more detail with reference to FIG. 2 2. In step 1, an originating party UE A, UE 1, sends an INVITE request 1 for establishing a communication session with another party, UE B. The INVITE Request 1 includes a precondition for requesting a supplementary service for the communication session. In this example the requested supplementary service is Advice of Charge (AoC). The precondition may be included in SDP and may be coded as:

"a=curr:aoc local none"
"a=curr:aoc remote none"
"a=des:aoc mandatory local sendrecv"
"a=des:aoc none remote sendrecv"

As already described before, the precondition indicates that the current local service level is none (parameters "local" and "none" in line "a=curr:aoc local none"), that the desired service level is "sendrecv" (both directions), and that the session establishment may not be completed until the desired service level has been reached (parameter "mandatory" in line "a=des:aoc mandatory local sendrecv"). The INVITE request 1 is received in the IMS core network, preferably by the CSCF 2 (FIG. 1) and application server, AS, 3, and is routed to UE B, UE 6 of FIG. 1, in step 2. For simplicity, the IMS core network in FIG. 2 has been illustrated with a single box 2, "AS/CSCF", characterizing that the IMS core network consists of required session control elements, CSCF, and one or more application servers, AS. For example, CSCF 2 may forward the INVITE request to AS 3 that provides the requested service. UE B receives the INVITE request 2 and detects, in step 2a, the precondition for requesting the supplementary service. Since the precondition is not yet met, UE B may not alert the user of terminal UE B, but instead, in step 3, UE B sends a provisional SIP response '183 session progress' towards the originating party. In step 4, UE A receives the '183 session progress' response indicating that the session establishment is progressing. In steps 5 to 8, a normal SIP provisional acknowledgement procedure is finished according to SIP standards. In step 9, the IMS core network "AS/CSCF", preferably an application server, AS, such as AS 3, provides the originating party with the requested supplementary service, in this example an AoC service. In step 10, UE A or its user, has locally determined that the requested supplementary service has been provided as requested, and the user of UE A has input a confirmation, or UE A has generated a confirmation. Hence, in a step 11, the UE A sends an UPDATE request to the IMS core network to indicate that the precondition is met.

Step 10 may be an optional step. Step 10 allows UE A to input the confirmation from the user of terminal UE A, if the user still wishes to proceed with establishing the communication session. For example, the user may decide to cancel the session establishment after having received information about estimated price of the session (AoC service). If the user of terminal UE A decides that the user does not wish to continue with establishing the communication session, instead of performing step 10 and the subsequent steps of FIG. 2, the session establishment is then cancelled according to standard SIP procedures.

In step 12, the IMS core network routes the UPDATE request to UE B. In steps 13 and 14 a normal SIP acknowledgement process is done. UE B may determine that the precondition set in the INVITE request 2 has now been met and thereby UE B may start, in step 15, alerting the user of terminal UE B. In steps 16 and 17, a "183 Ringing" response is sent from UE B to UE A indicating that the other party is now alerted. In steps 18 to 25, a normal SIP session establishment procedure is finished successfully.

Among others, benefits of above embodiment are that the IMS core network, CSCF or AS, does not have to act as back-to-back user agent (B2BUA) and precondition framework may be handled end-to-end, between UE A and UE B. In this embodiment, UE B supports precondition framework.

In the following another embodiment is described with reference to FIG. 3, in which UE B does not have to support precondition framework. The precondition framework is used between UE A and the IMS core network.

Figure 2:
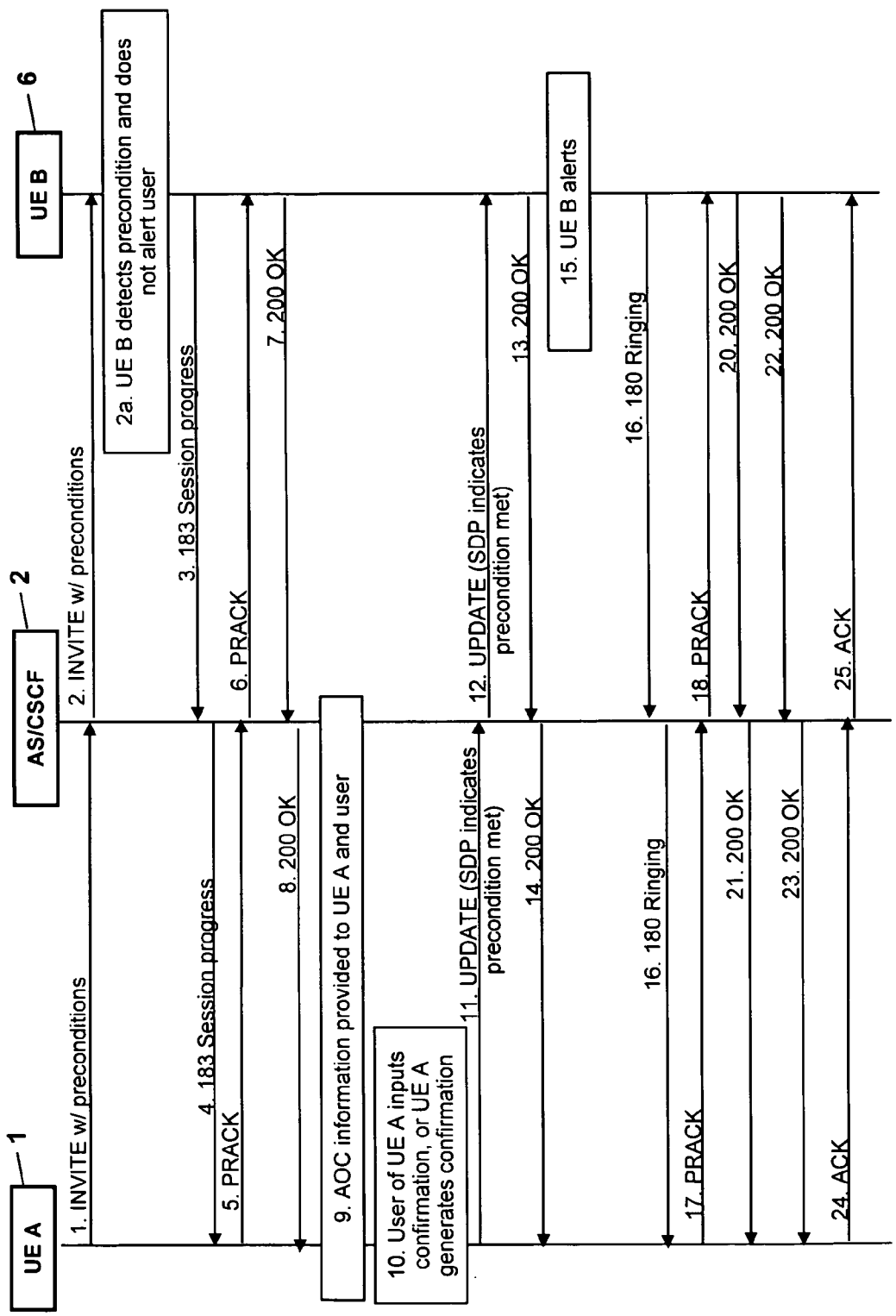
FIG. 2 illustrates an example of a call flow in embodiments of a system, method, and network elements of the invention in a case where a user requests a service such as AoC service and precondition frame work is supported end-to-end.
Figure 3:
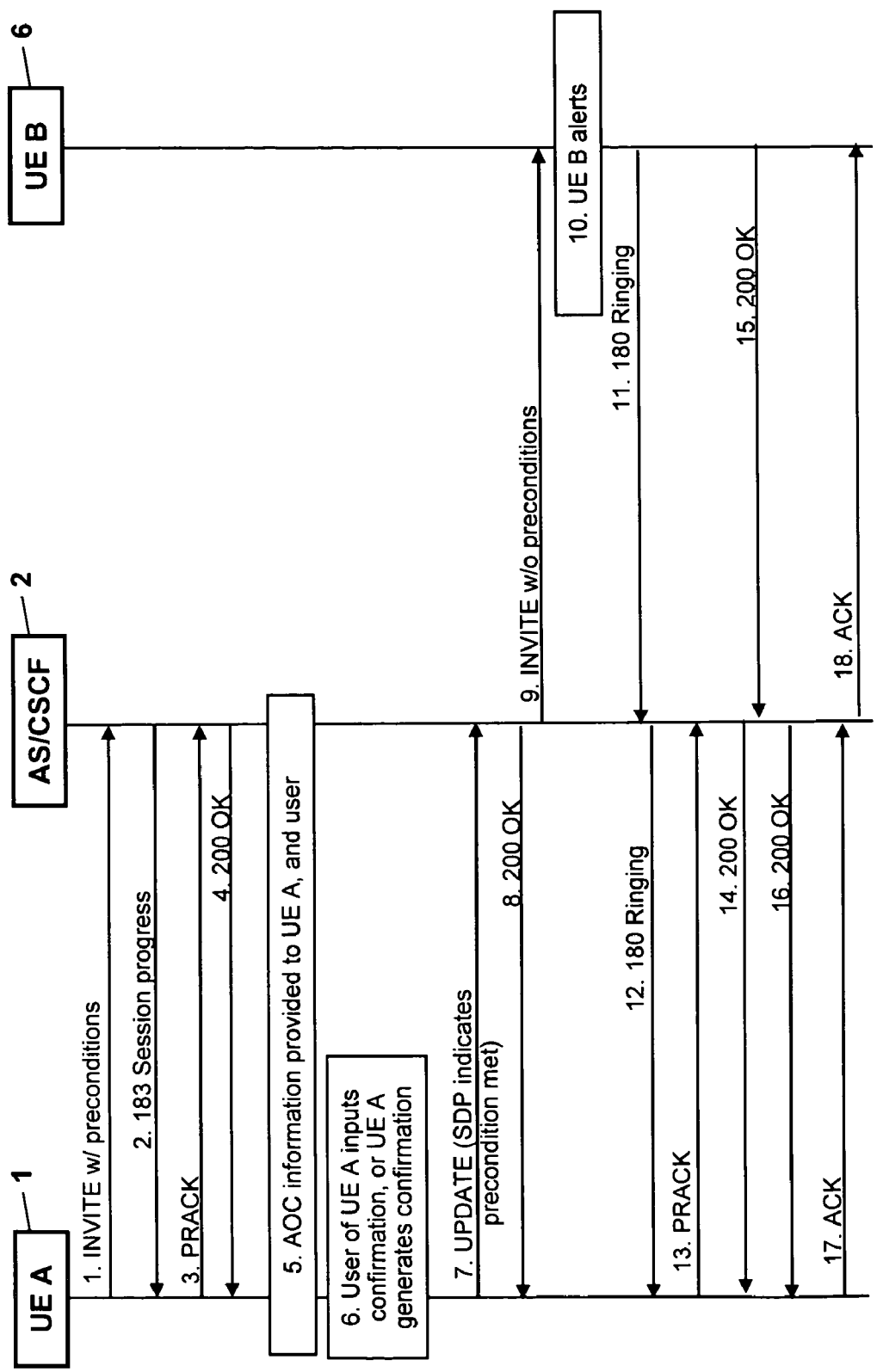
FIG. 3 shows an embodiment of a system, where the precondition framework is used only between the originating party and the IMS core network.

FIG. 3 illustrates this embodiment. As in the embodiment of FIG. 2, in step 1, an originating party UE A, UE 1, sends an INVITE request 1 for establishing a communication session with another party, UE B, UE 6. The INVITE Request 1 includes a precondition for requesting a supplementary service for the communication session. The precondition may be coded in SDP as in the embodiment of FIG. 2. In this example the requested supplementary service is Advice of Charge (AoC).

The INVITE request 1 is received in the IMS core network. Again, for simplicity, the IMS core network in FIG. 3 has been illustrated with a single box, "AS/CSCF" 6, characterizing that the IMS core network consists of required session control elements, CSCF, and one or more application servers, AS. The IMS core network, CSCF or AS, receives the INVITE request 1 and detects the precondition for requesting the supplementary service. Since the precondition is not yet met and precondition framework is used only between the IMS core network and the originating party, the INVITE request may not be forwarded by the IMS core network to UE B, otherwise UE B would alert the user of terminal UE B. Instead, in step 2, the IMS core network sends a provisional SIP response '183 session progress' to the originating party, UE A, indicating that the session establishment is progressing. In steps 3 and 4, a normal SIP provisional acknowledgement procedure is finished according to SIP standards. In step 5, the IMS core network "AS/CSCF" 2, preferably an application server, AS, provides the originating party with the requested supplementary service, for example, an AoC service. Optionally, in a step 6, UE A may input a confirmation from the user of terminal UE A, if the user still wishes to proceed with establishing the communication session. Alternatively the UEA may generate this confirmation automatically upon expiry of a defined time interval without the user cancelling the session establishment. In step 7, UE A has locally determined that the requested supplementary service has been provided as requested, or has confirmed it, and hence an UPDATE request is sent to indicate that the precondition has been met. The IMS core network receives the UPDATE request 7 and may determine that the precondition set in the INVITE request 1 has now been met. Thereby, in step 9, the IMS core network may continue the session establishment by routing the original INVITE request 1 to UE B, however, without precondition included in the INVITE request 9. In steps 10 to 18, UE B starts alerting the user of terminal UE B and a normal SIP session establishment procedure is finished successfully. In this embodiment, UE B does not have to support precondition framework, however, AS or CSCF in the IMS core network has to implement the precondition framework and act as B2BUA.

In another embodiment of the invention, an originating party may request a supplementary service using a precondition framework without requiring that the supplementary service be provided, in other words, the user allows a called party to be alerted even though the requested service is not provided. In this aspect of the invention, the desired preconditions state ("des" in the SDP) contains a strength-tag set to "optional".

The invention is not limited to controlling Advice of Charge, AoC, supplementary service, but may be in a similar manner applied to controlling the provisioning of other supplementary services associated with an establishment of a communication session. For example, in Terminating Identification Presentation (TIP) supplementary service the precondition framework may be used to hold an establishment of a communication session until an originating party is provided with an identity (e.g. a phone number or an Uniform Resource Identifier (URI)) of a terminating party to whom the session is to be connected, in other words the identity of a called party, or, in case a communication forwarding service has been activated by the called party, the identity of 'forwarded to' party (or the identity of the final destination, if subsequent forwarding(s) occur). In this embodiment, the originating party sets a precondition, such as "tip", in the SDP offer sent in an initial INVITE request. Optionally, an originating user may decide, after seeing the identity of the party to be alerted, if the user still wishes to proceed with establishing the communication session. The party to be connected is alerted only after receiving a confirmation, in a subsequent SIP UPDATE request from the originating party, that the precondition concerning TIP service has been met. The terminal of the originating user may generate the confirmation automatically after the terminal has determined that the terminating identity has been received within session setup signalling and has been displayed to the user of the terminal, or, alternatively the confirmation may be generated only after an explicit acceptance of the user of the terminal.

In another embodiment of the invention, a Reverse Charging Service (REV) supplementary service is provided using precondition framework. In this embodiment, an originating party sets a precondition, such as "rev", in the SDP offer sent in an initial INVITE request. The INVITE request is routed to an application server that provides REV service. The application server enquiries the called user if the user is willing to accept the charges for the session to be established. The application server may, for example, establish a call leg to the called party and play an announcement "a call is coming from number 123-456789010, do you want to accept the charges? If 'yes', press '1'...". Based on the decision of the called user the session establishment is either continued or not. Alternatively, using precondition framework, a calling party may request that the called user accepts the charges, but let the session to be established also in case the called user denies. This may be done by setting the "strength-tag" to value 'optional' instead of 'mandatory' in the initial offer. REV supplementary service may be requested using 'remote' parameter in precondition, e.g. "a=des:rev mandatory remote sendrecv", in which case a terminal of the called user is able to locally determine if the precondition is met, depending on the decision of the user of the terminal. As can be seen, the precondition framework may be used in many ways for requesting supplementary services for a communication session.

In one aspect of the invention, originating party only requests supplementary services as a generic feature using precondition framework in SDP offer sent to a called party, and the actual supplementary service (e.g. AoC, TIP or REV) is requested separately (outside precondition framework). The calling party may include in the SDP offer a precondition "suppl", instead of the precondition of a particular supplementary service requested by other means. This has an advantage e that the terminal of the called party does not need to support all possible preconditions ("aoc", "tip" or "rev"), but only the generic supplementary service precondition ("suppl"). From the generic supplementary service precondition ("suppl") the terminal of the called party may conclude, that there is a supplementary service to be provided to the originating party by the network, and that the called user should not be alerted until a confirmation is received that the supplementary service precondition ("suppl") has been met. In this embodiment, the called party is not aware of the exact supplementary service(s) provided to the originating party.

As a further alternative, an originating party may request in an INVITE request a specific supplementary service (e.g. AoC) using the precondition framework (e.g. "aoc" in SDP offer), but the IMS core network (AS or CSCF) that is providing the supplementary service to the originating party replaces the specific precondition (here "aoc") with a generic supplementary service precondition ("suppl") when routing the INVITE request to the called party. This alternative has advantages that a supplementary service may be requested using the precondition framework but a terminal of a called party does not need to support that particular precondition, as long as it supports the generic supplementary service precondition ("suppl") from which it may conclude that there is a supplementary service to be provided and that called party should not be alerted yet. This alternative is very similar to the embodiment of FIG. 3, but having a difference that the initial INVITE request may be immediately forwarded to the called party, but without causing the called user to be alerted. This may cut the total time used for setting up a connection.

Some supplementary services, for example Advice of Charge, are preferably provided by the originating IMS network that controls and provides services to the originating party (CSCF 2 and AS 3 in FIG. 1). However, some supplementary services may require functionality in the terminating IMS network (CSCF 5 and AS 7 in FIG. 1), for example Reverse Charging Service (REV) AS may be located in either in the originating or in the terminating IMS network. Some supplementary services may not set any requirements for application servers (AS), but all the necessary information may be derived from normal SIP setup signalling, for example an identity of a terminating party.

FIG. 4 shows a basic structure of an embodiment of a User Equipment, UE, device in accordance with the invention. The UE 40 can be used as UE 1 and/or UE 6. Only the parts relevant for present invention are described. The UE 40 comprises a display means 41, an input means 42, an alerting means 43, a memory means 44, a session control means 45, and a transmitting means 46. The memory means 44 is storing different type of information needed in operation of the UE 40, for example, settings relating to services. The session control means 45 implements the control functionality for communication sessions and communicates with the network, for example, sends and receives signaling messages. The display means 41 provides a display of information such as AoC charging information to a user of the UE 40. Using input means 42 the user may give commands such as a confirmation when accepting the displayed charges, to the UE 40. The input means 42 may also be used for inputting requests, precondition settings, etc. The alerting means 43 is provided to alert a user of UE 40 about a new incoming call.

When UE 40 starts to establish a new communication session, session control means 45 creates a signaling message to be sent to the network. As described before, the UE 40 may request a specific supplementary service in the initiating signaling message sent to the network. The request for a supplementary service may be detected by session control means 45 in various ways. For example, when the user decides to initiate a new session, preferably using input means 42, an input window may be provided to the user using display means 41, giving the user a possibility to select if some supplementary service(s) is to be requested for the session. Based on the choice of the user, indicated using input means 42, session control means 45 is able to include a corresponding parameter in the signaling message to be sent to the network via transmitting means 46. Alternatively, a user may store service related setting into memory means 44 of the UE 40. When a new session is to be established, session control means 45 may check the service related settings in memory means 44 and again session control means 45 may include a corresponding parameter in the signaling message to be sent to the network.

The above-mentioned methods and functions may also be combined. For example, session control means 45 may first check the settings in the memory means 44 and then prompt a user if the user wishes to maintain or change the default setting in the memory means 44 for the session. The same mechanisms may be used, by session control means 45, to detect if an indication of whether the session setup may be completed even though the supplementary service in question will not be provided for the session is to be included in the signalling message.

As described above, according to one or more embodiments of the invention, a user of the UE 40 may be asked to confirm if the user still wishes to proceed with session establishment after the requested supplementary service, e.g. potential charges (AoC), has been provided. In this embodiment, when the session control means 45 determines that the supplementary service has been provided, the information concerning the supplementary service may be displayed to the user of the UE 40 using display means 41 and the user may give his confirmation or rejection using input means 42.

If UE 40, as a called party, receives a signalling message for establishing a new communication session, session control means 45 may detect in the signalling message a precondition that a user of UE 40 must not be alerted ("phone to ring") until a supplementary service requested by a calling party has been provided. In this case, UE 40 may continue normal procedures relating to session establishment, however, the user of UE 40 will not be alerted until session control means 45 determines that the precondition relating to the requested supplementary service is met. Session control means 45 may determine this locally or by receiving a confirmation message from the network. Only after the precondition is met the user of UE 40 is alerted using alerting means 43.

FIG. 5 shows a basic structure of an embodiment of a user equipment 50 which may be used by a called or calling party, and may correspond to the user equipment 6 shown in FIGS. 1 to 3. The user equipment 50 comprises means 52 for receiving messages and user traffic, such as a signalling message for setting up a session of a communication service, the signalling message comprising a indication of a supplementary service to be provided to a calling user and an indication on whether the session setup is to be suspended until said supplementary service has been provided to the calling user. The user equipment 50 further comprises means 54 for detecting that said setting up the session of the communication service is to be suspended until said supplementary service has been provided, and means 55 for resuming said setting up the session of the communication service after determining that said supplementary service has been provided.

The user equipment 50 includes a customary display means 51 and an alerting means 53. The alerting means may also form part of the resuming means 55. The user equipment 50 further comprises a suspending means 56 which is configured to suppress alerting a user of the user equipment when a signalling message is received which comprises an indication of a supplementary service to be provided to a calling user and an indication of suspending the session setup until said supplementary service has been provided to the calling user.

Figure 6:
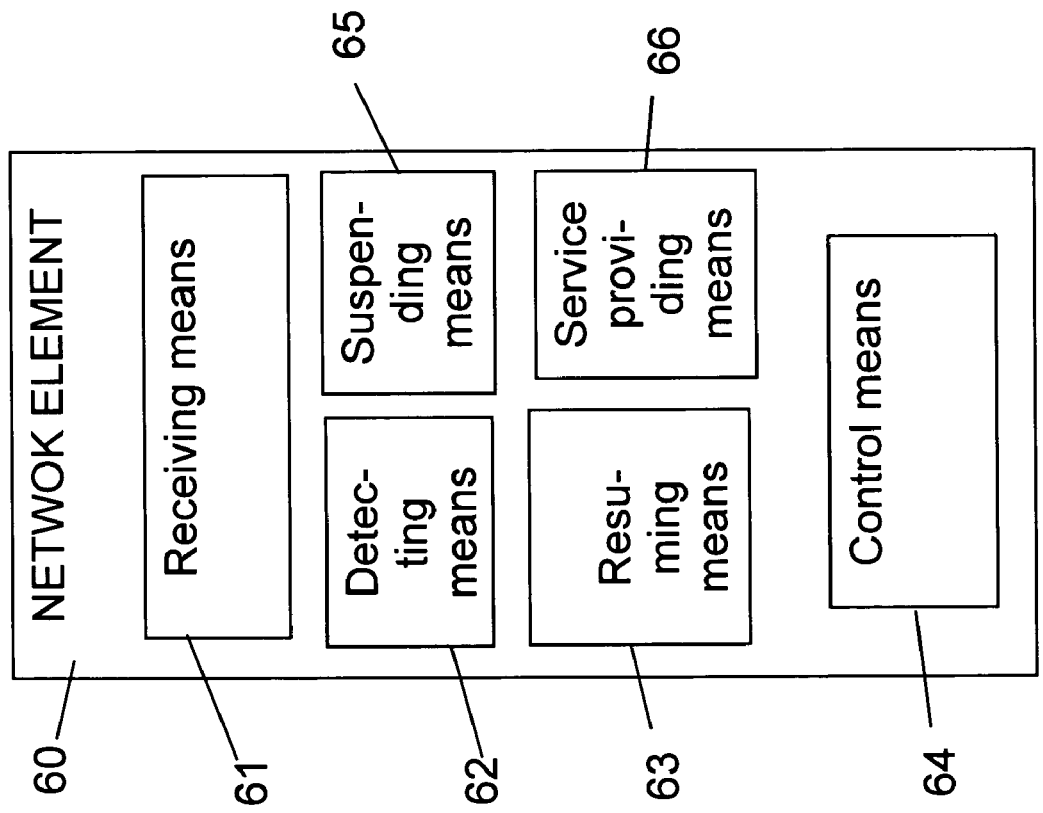
FIG. 6 shows an embodiment of a network element in accordance with the present invention.

FIG. 6 shows a basic structure of an embodiment of a network element 60 which may correspond to the network element 2 shown in FIGS. 1 to 3.

The network element 60 serves for providing a supplementary service at a session setup of a communication service, and comprises means 61 for receiving a signalling message for setting up a session of a communication service. This signalling message may comprises, as mentioned above, a request for a supplementary service and an indication on whether the session setup is to be suspended until said supplementary service has been provided. The network element 60 further includes a means 62 for detecting that said setting up the session of the communication service is to be suspended until said supplementary service has been provided, a means 66 for providing said supplementary service; and means 63 for resuming said setting up the session of the communication service after determining that said supplementary service has been provided. The network element 60 may also have a suspending means 65 for suspending the session setup, and a control means 64 fro controlling the network element 60.

The network element preferably is or includes a CSCF and/or an application server, e.g. element 3 of FIG. 1, of an IP Multimedia Subsystem.

The above mentioned steps and functions may be implemented using software. For programming the devices so as to implement the steps and functions, a computer program product may be provided which includes a program for a respective processing device such as network elements or user equipments, comprising software code portions for performing the steps or functions when the program is run on the processing device. The computer program product may comprise a computer-readable medium on which the software code portions are stored, and/or may be directly loadable into an internal memory of the processing device.

Although preferred embodiments have been described above, the invention is not limited thereto and may also be implemented in network elements, networks or structures of different types.

The invention claimed is:

1. Method, comprising:
   transmitting a signalling message for setting up a session of a communication service, the signalling message comprising
      a request for a supplementary service and
      an indication of whether the setting up of the session of the communication service is to be suspended until said supplementary service has been provided;
   detecting that said setting up the session of the communication service is to be suspended until said supplementary service has been provided;
   providing said supplementary service; and
   resuming said setting up the session of the communication service after determining that said supplementary service has been provided,
   wherein the signalling message comprises a precondition defining said request for said supplementary service and said indication of whether the session setup is to be suspended until said supplementary service has been provided, wherein the precondition comprises session initiation protocol precondition framework.

2. Method according to claim 1, comprising:
   suspending said setting up the session of the communication service until receiving a confirmation that the supplementary service has been provided, and
   resuming said setting up of the session of the communication service after receiving the confirmation of the supplementary service.

3. Method according to claim 1, wherein the suspending of the setting up of the session of the communication service is implemented by suppressing a step of alerting a called party.

4. Method according to claim 1, wherein the suspending of the setting up of the session of the communication service is implemented by not forwarding the session setup request to a called user equipment.

5. Method according to claim 1, wherein the resuming said setting up the session of the communication service is implemented in a calling user equipment, in a network element involved in providing the supplementary service, or in a called user equipment.

6. Method according to claim 1, wherein the supplementary service is at least one of
   an advice of charge service informing a user of a charge for the session of the communication service,
   a reverse charging service informing a called user on a request for charging the called user for the session of the communication service, and
   a terminating identification presentation supplementary service which provides an originating party with an identity of a called party to whom the session is to be connected, or, when a communication forwarding service has been activated by the called party, with an identity of a forwarded to party or an identity of a final destination.

7. The method of claim 1, wherein the precondition framework is defined by Internet Engineering Task Force (IETF) document Request for Comments (RFC) 3312.

8. Apparatus, comprising:
   a receiver configured to receive a signalling message for setting up a session of a communication service, the signalling message comprising a request for a supplementary service and an indication of whether the setting up of a session of the communication service is to be suspended until said supplementary service has been provided;
   a detector configured to detect that said setting up the session of the communication service is to be suspended until said supplementary service has been provided;
   a provider configured to provide said supplementary service; and
   a resumer configured to resume said setting up the session of the communication service after determining that said supplementary service has been provided,
   wherein the signalling message comprises a precondition defining said request for said supplementary service and said indication of whether the session setup is to be suspended until said supplementary service has been provided, wherein the precondition comprises session initiation protocol precondition framework.

9. Apparatus according to claim 8, wherein said resumer is configured to receive a further signalling message from said user, indicating that the requested supplementary service has been provided.

10. Apparatus according to claim 8, wherein the apparatus is a network element or an application server of an internet protocol multimedia subsystem.

11. Apparatus, comprising
   a receiver configured to receive a signalling message for setting up a session of a communication service, the signalling message comprising an indication of a supplementary service to be provided to a calling user and an indication of whether the setting up of the session of the communication service is to be suspended until said supplementary service has been provided to the calling user;
   a detector configured to detect that said setting up the session of the communication service is to be suspended until said supplementary service has been provided; and
   a resumer configured to resume said setting up the session of the communication service after determining that said supplementary service has been provided,
   wherein the signalling message comprises a precondition defining said request for said supplementary service and said indication of whether the session setup is to be suspended until said supplementary service has been provided, wherein the precondition comprises session initiation protocol precondition framework.

12. Apparatus according to claim 11 wherein said resumer is configured to receive a further signalling message indicating that the requested supplementary service has been provided to the calling user.

13. Apparatus according to claim 11 comprising a suspender configured to suppress alerting a user of the apparatus.

14. Apparatus according to claim 11 wherein said resumer is configured to alert a user of the apparatus.

15. Apparatus, comprising:
a transmitter configured to transmit a signalling message for setting up a session of a communication service, the signalling message comprising a request for a supplementary service and an indication that a called user is not to be alerted of the session to be set up until said supplementary service has been provided,
wherein the signalling message comprises a precondition defining said request for said supplementary service and said indication of whether the session setup is to be suspended until said supplementary service has been provided, wherein the precondition comprises session initiation protocol precondition framework.

16. Apparatus according to claim 15, comprising:
a determiner configured to determine that the requested supplementary service has been provided,
said transmitter being configured to transmit a further signalling message, indicating that the requested supplementary service has been provided.

17. Apparatus according to claim 15, comprising inputter configured to input, by a user of the apparatus, information for including said indication that a called user is not to be alerted of the session to be set up, into said signalling message.

18. Apparatus according to claim 15, wherein said transmitter is configured to transmit the further signalling message in response to an input given by a user of the apparatus.

19. System, comprising:
a transmitter configured to transmit a signalling message for setting up a session of a communication service, the signalling message comprising a request for a supplementary service and an indication of whether the session setup is to be suspended until said supplementary service has been provided;
a detector configured to detect that said setting up the session of the communication service is to be suspended until said supplementary service has been provided;
a provider configured to provide said supplementary service; and
a resumer configured to resume said setting up the session of the communication service after determining that said supplementary service has been provided,
wherein the signalling message comprises a precondition defining said request for said supplementary service and said indication of whether the session setup is to be suspended until said supplementary service has been provided, wherein the precondition comprises session initiation protocol precondition framework.

20. A computer program embodied on a computer readable medium, including a program for a processing device, comprising software code portions for
transmitting a signalling message for setting up a session of a communication service, the signalling message comprising a request for a supplementary service and an indication of whether the setting up of the session of the communication service is to be suspended until said supplementary service has been provided;
detecting that said setting up the session of the communication service is to be suspended until said supplementary service has been provided;
providing said supplementary service; and
resuming said setting up the session of the communication service after determining that said supplementary service has been provided,
wherein the signalling message comprises a precondition defining said request for said supplementary service and said indication of whether the session setup is to be suspended until said supplementary service has been provided, wherein the precondition comprises session initiation protocol precondition framework.

21. The computer program according to claim 20, wherein the program is configured to be directly loadable into an internal memory of the processing device.

22. A computer program embodied on a computer readable medium, including a program for a processing device, comprising software code portions for:
receiving a signalling message for setting up a session of a communication service, the signalling message comprising a request for a supplementary service and an indication of whether the setting up of the session of the communication service is to be suspended until said supplementary service has been provided;
detecting that said setting up the session of the communication service is to be suspended until said supplementary service has been provided;
providing said supplementary service; and
resuming said setting up the session of the communication service after determining that said supplementary service has been provided,
wherein the signalling message comprises a precondition defining said request for said supplementary service and said indication of whether the session setup is to be suspended until said supplementary service has been provided, wherein the precondition comprises session initiation protocol precondition framework.

23. A computer program embodied on a computer readable medium, including a program for a processing device, comprising software code portions for:
receiving a signalling message for setting up a session of a communication service, the signalling message comprising an indication of a supplementary service to be provided to a calling user and an indication of whether the session setup is to be suspended until said supplementary service has been provided to the calling user;
detecting that said setting up the session of the communication service is to be suspended until said supplementary service has been provided; and
resuming said setting up the session of the communication service after determining that said supplementary service has been provided,
wherein the signalling message comprises a precondition defining said request for said supplementary service and said indication of whether the session setup is to be suspended until said supplementary service has been provided, wherein the precondition comprises session initiation protocol precondition framework.

24. A computer program embodied on a computer readable medium, including a program for a processing device, comprising software code portions for:

transmitting a signalling message for setting up a session of a communication service, the signalling message comprising a request for a supplementary service and an indication that a called user is not to be alerted of the session to be set up until said supplementary service has been provided, wherein the signalling message comprises a precondition defining said request for said supplementary service and said indication of whether the session setup is to be suspended until said supplementary service has been provided, wherein the precondition comprises session initiation protocol precondition framework.

* * * * *